United States Patent [19]

Scopa et al.

[11] 3,824,706

[45] July 23, 1974

[54] EDUCATIONAL DEVICE

[76] Inventors: Paul P. Scopa, 21 Windsor Dr., Hingham, Mass. 02043; Naomi S. Kelman, 367 Newton St., Chestnut Hill, Mass. 02167

[22] Filed: May 9, 1973

[21] Appl. No.: 358,593

[52] U.S. Cl. ................................ 35/9 C, 35/7 A
[51] Int. Cl. ............................................ G09b 7/06
[58] Field of Search ............................ 35/9 C, 7 A

[56] References Cited
UNITED STATES PATENTS

| | | | |
|---|---|---|---|
| 2,627,672 | 2/1953 | Polton | 35/9 C |
| 2,860,422 | 11/1958 | May | 35/9 C |
| 2,943,400 | 7/1960 | Griswold | 35/9 C |
| 3,106,027 | 10/1963 | Thelen | 35/9 C |
| 3,156,056 | 11/1964 | Pribil | 35/7 A X |

*Primary Examiner*—Wm. H. Grieb
*Attorney, Agent, or Firm*—Joseph Zallen

[57] ABSTRACT

A flexible sheet having indicia and orifices on its front. The sheet has a median conducting layer and rear orifices registerable with selected front orifices. Used with a support containing a source of power and a signal a child actuates the signal when the probe goes into the correct orifice.

3 Claims, 6 Drawing Figures

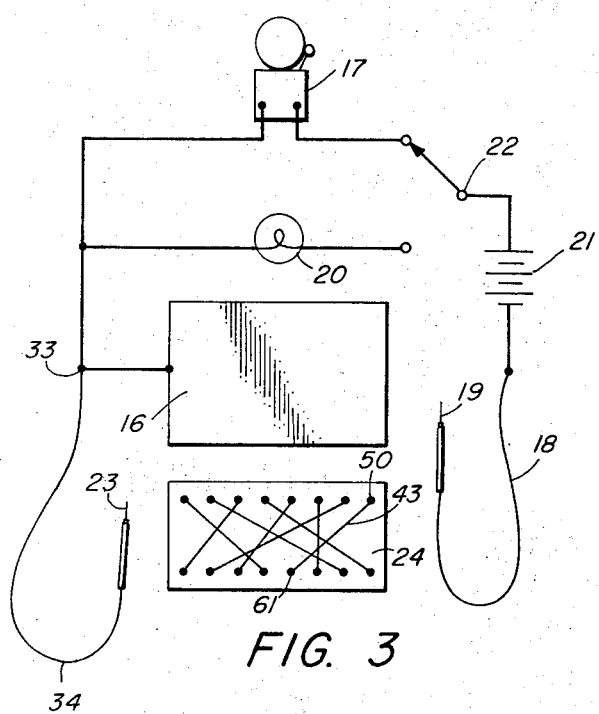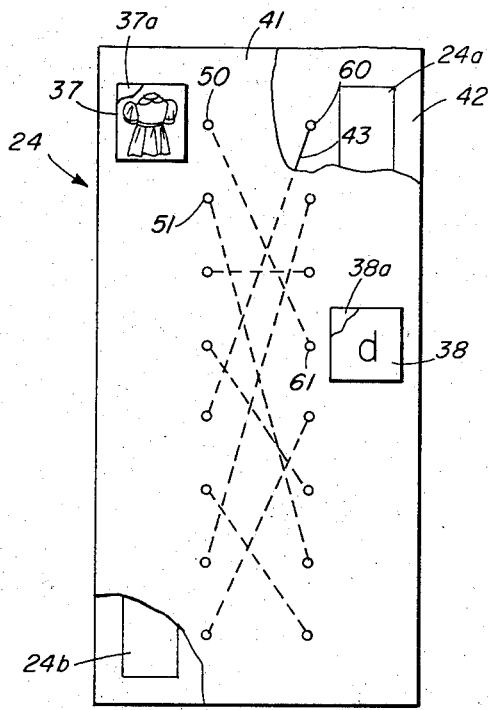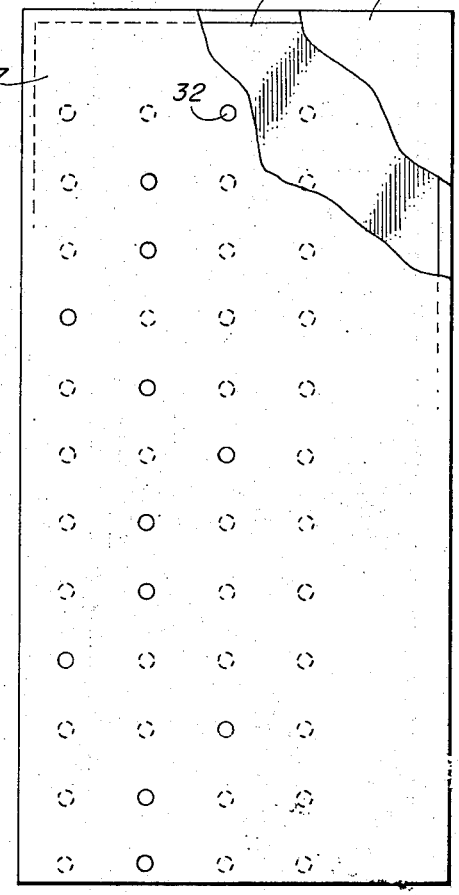

3,824,706

EDUCATIONAL DEVICE

BACKGROUND OF INVENTION

This invention relates to educational devices. In particular, it relates to testing devices for young children.

In testing young children with elementary symbols, letters, numbers and words, it is a common practice to utilize various forms of associations.

One object of the present invention is to provide an apparatus whereby the child can utilize the concept of matching or memorizing words, symbols, numbers or the like with a minimum of verbal direction by the teacher.

Other objects and advantages of this invention will be apparent from the description and claims which follow taken together with the appended drawings.

SUMMARY OF INVENTION

The present invention comprises broadly a flexible sheet which is a laminate of a front insulating layer, a median conducting layer and a rear insulating layer. The front layer has indicia and orifices. Each array of orifices is associated with a selected array of indicia. The rear layer has orifices. However, the orifices in the rear layer are such that for each array of front orifices there is only one rear orifice and that is registerable with only one of said array.

The device is adapted to be used with a support containing a source of power, and an audible or visual signal, which are interconnected so that one end terminates in a conductive probe while the other terminates in a conductive sheet. Contacting of the probe with the conductive surface completes the circuit and hence actuates the alarm.

When the laminate sheet is placed on such a support, the alarm will be actuated if the conductive probe is inserted into a front orifice which registers with a rear orifice on the sheet. This is brought about by the pressure of the probe on the conducting layer in the sheet causing it in turn to press against the conductive surface of the support and hence complete the circuit.

The child is tested both visually and auditorily by simply matching symbols and using the probe to indicate the correct response. This invention is accordingly faster and more economical for use in the school system. Further, it has child appeal and the need for verbal instructions by the teacher is much less.

BRIEF DESCRIPTION OF DRAWINGS

FIG. 3 is a schematic diagram of the electrical circuits for two alternative forms of the invention.

FIG. 4 is a front view of a testing sheet made in accordance with this invention.

FIG. 5 is a rear view of the testing sheet with cutaway to show the three-layer construction.

FIG. 6 is a front view of a different form of a testing sheet for use in this invention.

SPECIFIC EXAMPLES OF INVENTION

Figure 1:
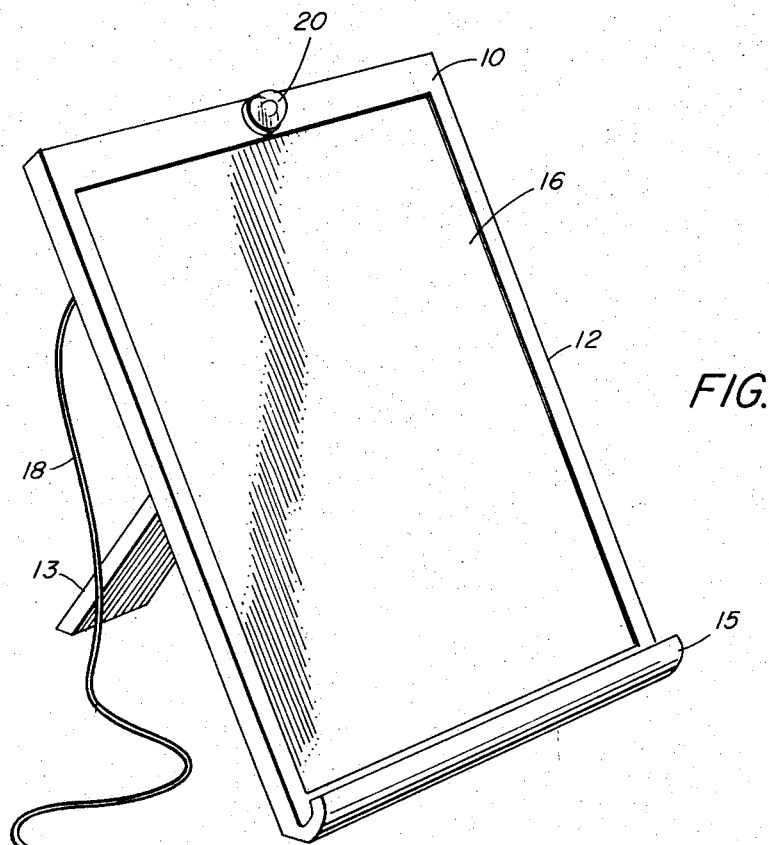
FIG. 1 is a front perspective view of the support member of one embodiment of this invention.
Figure 2:
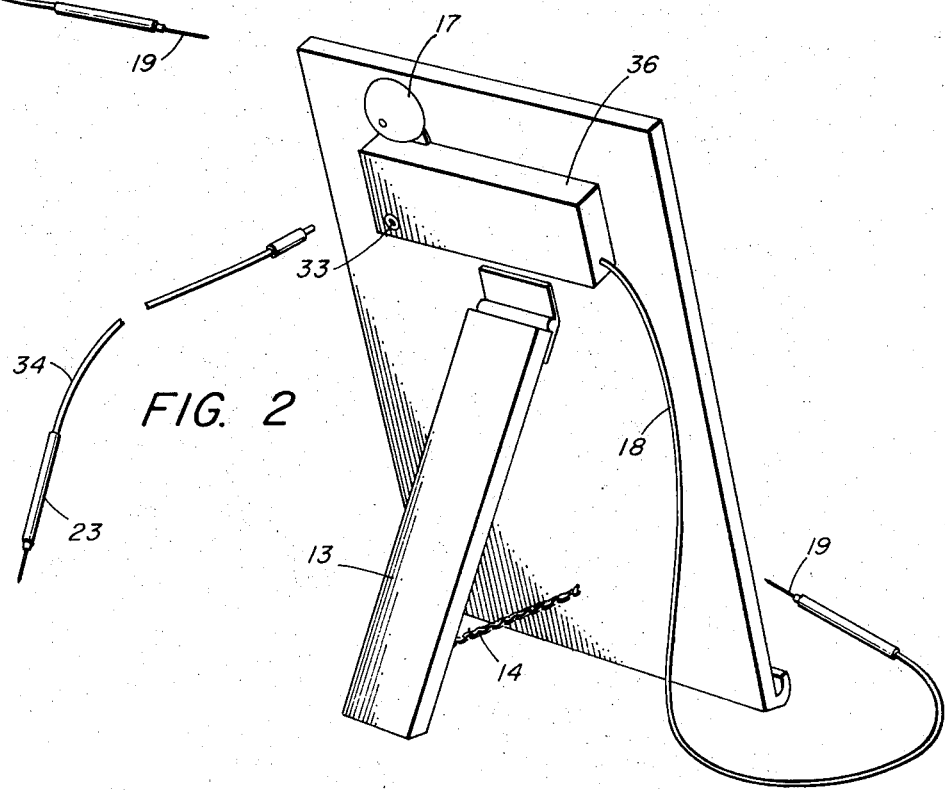
FIG. 2 is a rear perspective view of the support member of FIG. 1.

Referring now to FIGS. 1 to 5, the invention illustrated therein comprises a support member 10 and a testing sheet 11. The support member 10 is in the shape of an easel and includes a frame portion 12 made of an insulating material such as wood or plastic with a rear folding leg 13, chain 14 and support trough 15. On the front face of the support member 10 is a conductive metal sheet 16 which covers most of the surface except for the border. Attached to the rear of the frame 10 is a box 36 housing electrical components, an audible alarm 17 mounted on the frame 12 and a flexible elongated insulated electrical lead 18 extending from the box 36 and terminating in a thin metal probe 19. On the front surface of the frame 12 a lamp 20 is mounted. Both the alarm 17 and lamp 20 are connected to the electrical circuit housed within box 36 as explained below.

The circuit housed within box 36 comprises batteries 21, one side of which is connected to a switch 22 and the other side through wire 18 to probe 19. Switch 22 can alternatively connect the battery 21 to the bell 17 or the lamp 20. In either position it will connect the battery to the conductive sheet 16. The circuit will be completed when probe 19 is placed in contact with sheet 16 as explained below in the description of the teaching sheet.

The circuit illustrated in FIG. 3 also includes an alternative to complete the circuit when the teaching sheet of FIG. 6 is used. In this case, as explained in detail below, the circuit will be completed by the use of an additional probe 23 in conjunction with the teaching sheet 24.

The testing sheet illustrated in FIGS. 4 and 5 is a laminate having a front flexible insulating indicia layer 27, a median flexible conducting layer 26, and a back flexible insulating layer 25. The indicia layer 27 is characterized as having arrays of perforations as, for example 12 arrays of four perforations each. The perforations are large enough to admit the probe 19 so that it can make physical contact with the flexible conductive sheet 26. However, the rear layer 25 has only one perforation in the area which registers with any particular front array. Thus, the front perforations 28, 29, 30 and 31 on the front array will all admit the probe 19 so that it can press against the conductive sheet 26. However, there is only one perforation 32 on the rear layer 25 and this registers with a pre-selected one of the four; in this instance it registers with perforation 29.

A person manipulating probe 19 will complete the circuit and thus actuate either the alarm 17 or the lamp 20 only by inserting the probe 19 through perforation 29 where it presses the conductive layer 26 through orifice 32 to place it in contact with the conductive sheet 16 mounted on the support frame 12. In a similar fashion each of the other arrays has only one rear perforation registering with a pre-selected front orifice. In the testing sheet illustrated in FIG. 4, for example the child is told to match the indicia on the extreme left on any array with a similar indicia among the four in the array. Only when the child selects the proper match by placing the probe into the proper perforation does he complete the circuit and thus actuate either the audible signal or the lamp. This permits wide latitude and the design of the various indicia such as words, syllables, symbols or the like which can be devised and used to help test children and to evaluate their disabilities.

The embodiment illustrated in FIG. 6 is somewhat different. The sheet 24 illustrated in FIG. 6 comprises a pair of flexible insulating sheets 41 and 42 which house wiring 43. On the front surface of sheet 41 are two vertical arrays of electrical contacts 50 and 60. Each contact is associated with an indicia on the front surface. The wires 43 connect only one contact in array 50 with only one contact in array 60. However, because the wires 43 are concealed between the inner and outer layers 41 and 42 the person using the testing sheet 24 has no way of knowing which contact in row 50 is connected with which contact in row 60.

Accordingly, indicia can be placed adjacent each contact in each array and the child can be asked to match the proper indicia in the left row with the proper indicia in the right row by applying probes to the correct contacts. A connection 33 is provided in box 36 for attachment of a lead 34 terminating in probe 23, in addition to probe 19. When the correct contacts are used, the circuit is completed (as illustrated in FIG. 3) and the alarm 17 or lamp 20 is actuated. Thus, contact 50 in the left row is connected to contact 60 in the right row so that when probe 19 is applied to contact 50 and probe 23 to contact 60 the circuit is actuated.

In a variation of the embodiment illustrated in FIG. 6, the indicia members, e.g. 37 and 38, have magnetic backs 37a and 38a and sheet 24 has strips or layers 24a and 24b made of iron or other materials capable of being attracted by the magnetic material 37a and 38a.

We claim:

1. A testing device comprising in combination a support and a single, unattached indicia sheet positioned on said support; said support having a front conductive surface, a source of electrical current, a signal device, and a thin, conductive probe on a flexible, elongated lead; said source, signal device and probe being electrically connected so that electrical contact of the probe with the conductive surface actuates the signal device; said indicia sheet being positioned on said conductive surface; said sheet comprising a laminate of a front insulating layer (27) bearing indicia, a median conducting layer (26), and a rear insulating layer (25), said front layer having at least one array of a plurality of orifices associated with selected indicia; said rear layer having an orifice registerable with only one said array of front orifices, said rear orifice not being visible from the front; said sheet being further characterized in that insertion of said conductive probe into a registering front orifice causes the adjacent portion of the conductive layer to protrude through said rear orifice and contact said conductive surface with the result that said probe is in electrical connection with said conductive surface and said signal device is actuated.

2. The testing device of claim 1 wherein the signal device can be selectively audible or visual.

3. The testing device of claim 1 wherein said sheet comprises a plurality of parallel arrays, each comprising a first indicia without an orifice and a plurality of second indicia each associated with an orifice, a selected one of said second indicia being identical with said first indicia and having its associated orifice registerable with a rear orifice.

* * * * *